United States Patent
Gandra et al.

(10) Patent No.: US 11,888,829 B2
(45) Date of Patent: Jan. 30, 2024

(54) DYNAMIC ROUTING AND ENCRYPTION USING AN INFORMATION GATEWAY

(71) Applicant: 7-Eleven, Inc., Irving, TX (US)

(72) Inventors: Srikanth Gandra, Frisco, TX (US); Veena Vadvadgi, Plano, TX (US)

(73) Assignee: 7-ELEVEN, INC., Irving, TX (US)

( * ) Notice: Subject to any disclaimer, the term of this patent is extended or adjusted under 35 U.S.C. 154(b) by 43 days.

(21) Appl. No.: 17/650,651

(22) Filed: Feb. 10, 2022

(65) Prior Publication Data

US 2023/0254297 A1    Aug. 10, 2023

(51) Int. Cl.
H04L 9/40    (2022.01)

(52) U.S. Cl.
CPC ............... *H04L 63/0471* (2013.01)

(58) Field of Classification Search
CPC ............. H04L 63/0471; H04L 63/0428; H04L 63/0464
See application file for complete search history.

(56) References Cited

U.S. PATENT DOCUMENTS

| | | | | |
|---|---|---|---|---|
| 5,812,671 | A * | 9/1998 | Ross, Jr. | H04L 9/40 713/153 |
| 9,698,984 | B2 * | 7/2017 | Fujii | H04L 9/3247 |
| 2007/0258468 | A1 * | 11/2007 | Bennett | H04L 63/0464 370/400 |
| 2008/0095337 | A1 * | 4/2008 | Cai | H04L 51/23 379/88.22 |
| 2008/0154775 | A1 * | 6/2008 | Soukup | H04N 21/2347 348/E7.071 |
| 2009/0257593 | A1 * | 10/2009 | Losovsky | H04L 63/0464 380/259 |
| 2009/0271627 | A1 * | 10/2009 | Cohen | H04L 9/0836 713/171 |
| 2010/0274692 | A1 * | 10/2010 | Hammad | G06Q 20/12 705/30 |
| 2012/0023571 | A1 * | 1/2012 | Spies | H04L 9/3073 380/278 |

(Continued)

OTHER PUBLICATIONS

Minqing et al., "Group Key Management Using Proxy Re-encryption for Dynamic Networks", Mar. 2010, Second International Workshop on Education Technology and Computer Science, pp. 190-193 (Year: 2010).*

*Primary Examiner* — Kenneth W Chang
(74) *Attorney, Agent, or Firm* — BAKER BOTTS L.L.P.

(57) ABSTRACT

A device is configured to receive a data request that includes an encrypted data element. The device is further configured to identify a data source device associated with the data request, to identify a first encryption key associated with the data source device, and to decrypt the encrypted data element using the first encryption key. The device is further configured to identify a first data processor device associated with receiving the data request, to identify a second encryption key associated with the first data processor device, wherein the second encryption key is different from the first encryption key, and to re-encrypt the decrypted data element. The device is further configured to identify routing instructions associated with the first data processor device and to send the re-encrypted data element to the first data processor device in accordance with the routing instructions.

20 Claims, 3 Drawing Sheets

(56) References Cited

U.S. PATENT DOCUMENTS

2013/0144906 A1\* 6/2013 Bhupalam ............. H04L 65/612
707/E17.014
2013/0182842 A1\* 7/2013 Fasoli ................... H04L 9/0861
380/255

\* cited by examiner

DYNAMIC ROUTING AND ENCRYPTION USING AN INFORMATION GATEWAY

TECHNICAL FIELD

The present disclosure relates generally to information security, and more specifically to dynamic routing and encryption using an information gateway.

BACKGROUND

In a network environment, network devices are in data communication with other network devices that may be distributed anywhere in the world. These network environments allow data and information to be shared among devices. Some of the technical challenges that occur when data is exchanged between devices are controlling data leakage, unauthorized access to data, and preventing malicious activities. Data storing devices, such as network devices, databases, and servers, are vulnerable to attacks. This vulnerability poses several network security challenges. Existing systems are typically unable to detect a network attack until after the attack has occurred. For example, a bad actor may gain unauthorized access to information, files, or documents that are also stored in a network device. Having a delayed response allows the bad actor to gain access to sensitive information within the network.

SUMMARY

The disclosed system provides several practical applications and technical advantages that overcome the previously discussed technical problems. The following disclosure provides a practical application of an information gateway device for an information system. The disclosed information gateway device provides practical applications that improve the resource utilization of the information system by storing routing information and encryption information for communications between network devices in a centralized location. This process allows the information system to break up the end-to-end encryption between a data source device and a data processor device. Since the encryption techniques and keys that are used by data processor devices may change over time, the information system keeps track of the changes and updates the encryption keys that are used accordingly. This process allows these changes to be made locally by the information system instead of having to communicate all the changes to all of the data source devices every time that a new change occurs. This process avoids the need for frequently communicating with data source devices to update their encryption and routing information, which reduces unnecessary network bandwidth consumption and improves the resource utilization of the information system. By improving resource utilization, the information system can increase the throughput of the information system and improve the overall performance of the information system.

In addition, the disclosed information gateway device provides practical applications that improve the information security of the information system by reducing the amount of sensitive information that is transmitted over the network. For example, the disclosed information system reduces the need for frequently transmitting sensitive information, such as encryption information and routing information, over the network. This process provides a technical advantage because it reduces the likelihood of a bad actor gaining access to this sensitive information. By reducing the amount of sensitive information that is transmitted over the network, the information system can prevent unauthorized access to any sensitive information. Thus, the disclosed process improves the information security and overall operation of the information system. Improving information security for the information system also improves the underlying network and the devices within the network. For example, when a data exfiltration attack occurs, there is an increase in the number of network resources and bandwidth that are consumed which reduces the throughput of the network. By preventing data exfiltration attacks, the information system can prevent any unnecessary increases in the number of network resources and bandwidth that are consumed that would otherwise negatively impact the throughput of the information system.

In one embodiment, the information system comprises an information gateway device that is configured to receive a data request that includes an encrypted data element. The information gateway device is further configured to identify a data source device associated with the data request, to identify a first encryption key associated with the data source device, and to decrypt the encrypted data element using the first encryption key. The information gateway device is further configured to identify a first data processor device associated with receiving the data request, to identify a second encryption key associated with the first data processor device, wherein the second encryption key is different from the first encryption key, and to re-encrypt the decrypted data element. The information gateway device is further configured to identify routing instructions associated with the first data processor device and to send the re-encrypted data element to the first data processor device in accordance with the routing instructions.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

System Overview

Figure 1:
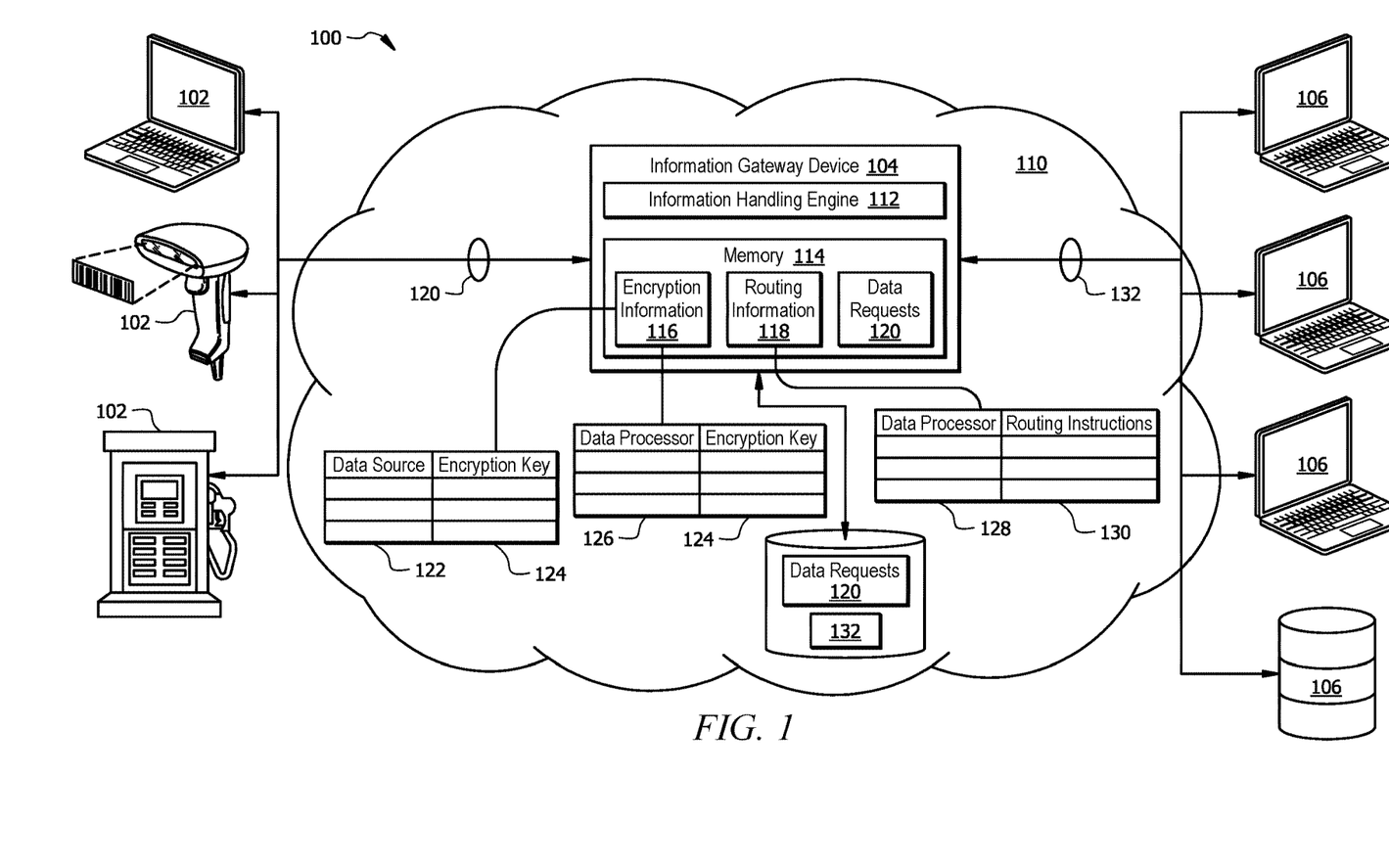
FIG. 1 is a schematic diagram of an embodiment of an information system that is configured to employ dynamic routing and encryption.

FIG. 1 is a schematic diagram of an embodiment of an information system 100 that is generally configured to route data requests 120 from a data source device 102 to a data processor device 106. A data request 120 comprises one or more encrypted data elements 132 that are to be processed by a data processor device 106. The encrypted data elements 132 may comprise digital documents, account information, or any other suitable type of information. The information system 100 is configured to store and use routing information 118 and encryption information 116 in a centralized location to break up the end-to-end encryption between a data source device 102 and a data processor device 106. Over time, the encryption techniques and keys that are used by the data processor devices 106 may change, for example for security reasons. The information system 100 is configured to employ an information gateway device 104 keeps track of the changes and updates the encryption keys that are used. This process allows the information system 100 to make updates in a centralized location using the information gateway device 104 instead of having to communicate all the changes to all of the data source devices 102 every time that a new change occurs. In other words, this process avoids the need for frequently communicating with data source devices 102 to update their encryption information 116 and routing information 118, which reduces unnecessary network bandwidth consumption and improves the resource utilization of the information system 100.

In one embodiment, the information system 100 comprises a plurality data source devices 102, an information gateway device 104, a plurality of data processor devices 106, and a database 108 that are in signal communication with each other within a network 110. Network 110 allows communication between and amongst the various components of the information system 100. This disclosure contemplates network 110 being any suitable network operable to facilitate communication between the components of the information system 100. Network 110 may include any interconnecting system capable of transmitting audio, video, signals, data, messages, or any combination of the preceding. Network 110 may include all or a portion of a local area network (LAN), a wide area network (WAN), an overlay network, a software-defined defined network (SDN), a virtual private network (VPN), a packet data network (e.g., the Internet), a mobile telephone network (e.g., cellular networks, such as 4G or 5G), a Plain Old Telephone (POT) network, a wireless data network (e.g., WiFi, WiGig, WiMax, etc.), a Long Term Evolution (LTE) network, a Universal Mobile Telecommunications System (UMTS) network, a peer-to-peer (P2P) network, a Bluetooth network, a Near Field Communication (NFC) network, a Zigbee network, and/or any other suitable network.

Data Source Devices

A data source device 102 is a hardware device that is generally configured to provide hardware and software resources to a user. Examples of the data source device 102 include, but are not limited to, a smartphone, a tablet, a laptop, a computer, a smart device, a database, a fuel dispenser terminal, a point-of-sale (POS) device, a handheld scanner device, a card reader, or any other suitable type of device. In general, the data source device 102 is configured to generate a data request 120 for a user that comprises one or more encrypted data elements 132 and to send the data request 120 to a data processor device 106 via the information gateway device 104 for processing. The one or more encrypted data elements 132 are sent to a data processor device 106 for processing. In one embodiment, an encrypted data element 132 comprises account information that is associated with a user. Examples of account information include, but are not limited to, information that is associated with a user account, an employee account, a school account, an entity account, a financial account, or any other suitable type of account. As an example, the account information may comprise information associated with a financial account for a user. In this example, the encrypted data element 132 may further comprise additional interaction information such as a product or service identifier, an amount for a product or service, or any other suitable type of information. For instance, the data source device 102 may be a fuel dispenser terminal configured to facilitate a fuel procurement for a user. In this example, the fuel dispenser terminal is configured to obtain card information for the user via a card reader and to generate a data request 120 that comprises the card information and an amount for the fuel. The data request 120 is sent to a data processor device 106 that is configured to facilitate an interaction for the fuel procurement using the information provided in the data request 120. As another example, the data source device 102 may be a POS device that is configured to facilitate a product procurement for a user. In this example, the POS device is configured to obtain card information for the user and to generate a data request 120 that comprises the card information, one or more product identifiers, and an amount for the items. The data request 120 is sent to a data processor device 106 that is configured to facilitate an interaction for the product procurement using the information provided in the data request 120. In other embodiments, an encrypted data element 132 comprises a digital document for processing. Examples of digital documents include, but are not limited to, text files, tables, charts, presentations, images, files, documents, or any other suitable type of digital data. For instance, the data source device 102 may be a computer that is configured to generate a data request 120 that comprises one or more data files for processing.

Data Processor Devices

A data processor device 106 is a hardware device that is generally configured to provide hardware and software resources for processing data. Examples of the data processor device 106 include, but are not limited to, a computer, a server, a database, or any other suitable type of device. In general, the data processor device 106 is configured to receive a data request 120 or data elements 132 from a data source device 102 via the information gateway device 104 and to process the received data request 120 or data elements 132. For example, when the data element 132 comprises interaction information, the data processor device 106 may facilitate an interaction using the interaction information. As another example, when a data request 120 or a data element 132 comprises a digital document for processing, the data processor device 106 may store the digital document, modify the digital document, extract information from the digital document, and/or perform any other suitable type of operation on the digital document. In other examples, the data processor device 106 may perform any other suitable type of operations to process a data request 120 or a data element 132.

Information Gateway Device

Examples of an information gateway device 104 include, but are not limited to, a server, an access point, a computer, or any other suitable type of network device. In one embodiment, an information gateway device 104 comprises an information handling engine 112 and a memory 114. Additional details about the hardware configuration of the information gateway device 104 are described in FIG. 3. The memory 114 is configured to store encryption information 116, routing information 118, data requests 120, and/or any other suitable type of data.

In one embodiment, the information handling engine 112 is generally configured to receive data requests 120 from a data source device 102, to decrypt one or more data elements 132 within the data request 120, to re-encrypt the data elements 132 based on the intended data processor device 106 for the data request 120, and to send the re-encrypted data elements to the data processor device 106. This process allows the information gateway device 104 to break up end-to-end encryption between a data source device 102 and a data processor device 106. Since the encryption techniques and keys that are used by the data processor devices 106 may change over time, for example for security reasons, the information gateway device 104 keeps track of the changes and updates the encryption keys that are used. This process allows these updates to be stored and made by the information gateway device 104 instead of having to communicate all the changes to all of the data source devices 102 every time that a new change occurs. An example of the information handling engine 112 performing this operation is described in more detail in FIG. 2.

The encryption information 116 generally comprises a mapping between devices (e.g. data source device 102 and data processor devices 106) and encryption keys 124 that are associated with each device. Examples of encryption keys 124 include, but are not limited to, hashing keys, private keys, public keys, or any other suitable type of encryption key. For example, the encryption information 116 may comprise a plurality of data source device identifiers 122. Examples of data source device identifiers 122 include, but are not limited to, an alphanumeric identifier, an Internet Protocol (IP) address, a Media Access Control (MAC) address, an email address, a phone number, a device type, or any other suitable type of identifier. In this example, each data source device identifier 122 is mapped to an encryption key 124 that is used by a corresponding data source device 102 to encrypt data elements within a data request 120.

The encryption information 116 further comprises a plurality of data processor device identifiers 126. Examples of data processor device identifiers 126 include, but are not limited to, an alphanumeric identifier, an IP address, a MAC address, an email address, a phone number, a device type, or any other suitable type of identifier. In this example, each data processor device identifier 126 is mapped to an encryption key 124 that is used by a corresponding data processor device 106 to decrypt data elements.

The routing information 118 generally comprises a mapping between a data processor device 106 and routing instructions 130 for communicating with the data processor device 106. For example, routing instructions 130 may comprise a plurality of data processor device identifiers 128. In this example, each data processor device identifier 128 is mapped to routing instructions 130 for how to send data elements to a corresponding data processor device 106. Examples of routing instructions 130 include, are not limited to, an IP address, a MAC address, a file directory, a folder address, an email address, a phone number, or any other type of address for a data processor device 106.

Database

Examples of a database 108 include, but are not limited to, file repositories, computers, databases, memories, servers, shared folders, or any other suitable type of networking device. In some embodiments, the database 108 may be configured to store data requests 120, encryption information 116, routing information 118, and/or any other suitable type of information that is associated with the information system 100. For example, the information gateway device 104 may store copies of any received data requests 120 or data elements 132 in the database 108. As another example, the information gateway device 104 may temporarily store data requests 120 or data elements 132 (e.g. re-encrypted data elements 132) in the database 108 when a data processor device 106 is unavailable. In this example, the information gateway device 104 may retrieve any stored data requests 120 or data elements 132 to send to the data processor device 106 at a later time when the data processor device 106 becomes available. In FIG. 1, the information system 100 shows a single database 108. In other embodiments, the information system 100 may comprise any other suitable number of databases 108. In some embodiments, the database 108 may be optional and omitted.

Information Routing Process

Figure 2:
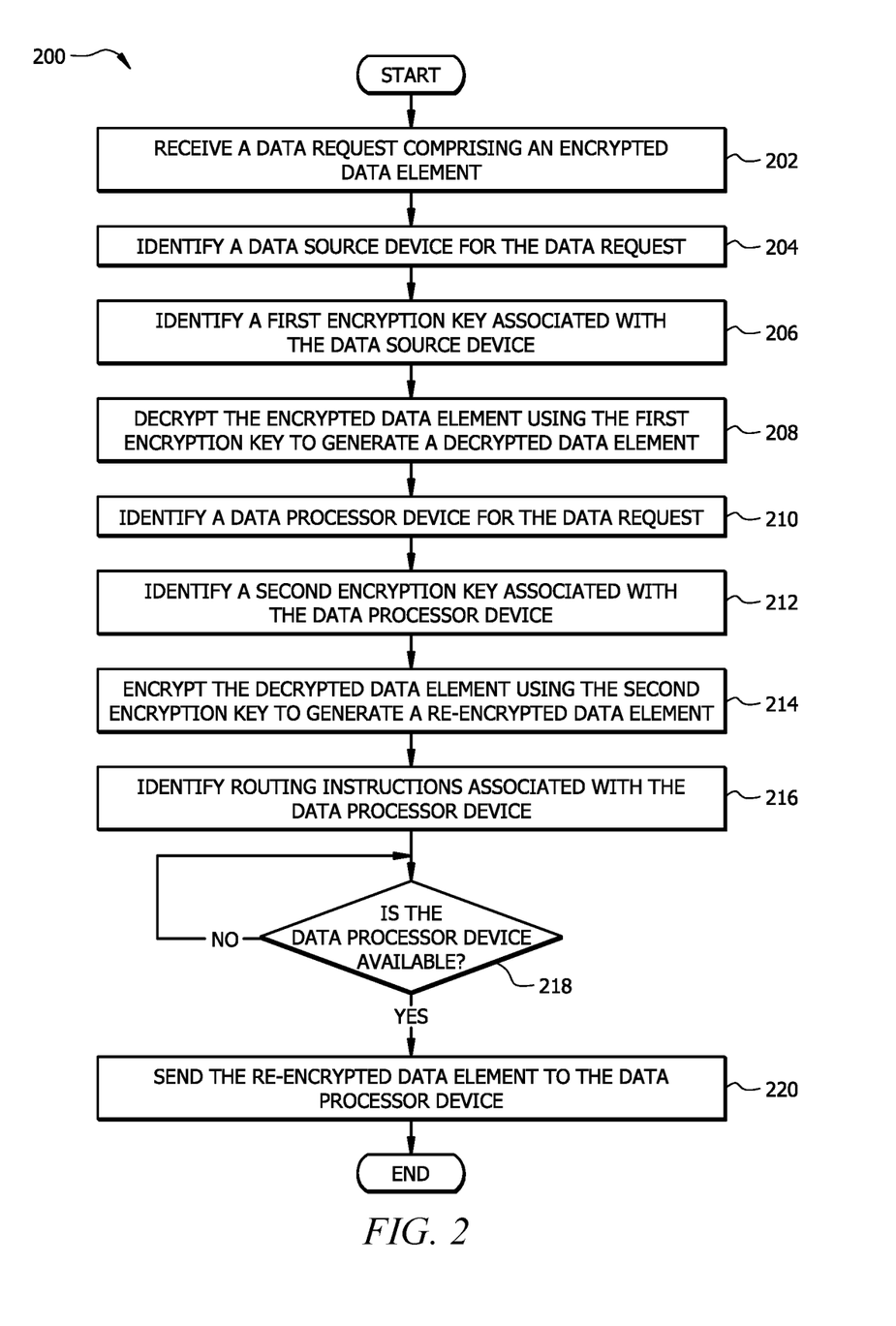
FIG. 2 is a flowchart of an embodiment of an information routing process for the information system.

FIG. 2 is a flowchart of an embodiment of an information routing process 200 for the information system 100. The information system 100 may employ process 200 to route data requests 120 from a data source device 102 to a data processor device 106. Process 200 allows the information system 100 to store and use routing information 118 and encryption information 116 in a centralized location which breaks up the end-to-end encryption between a data source device 102 and a data processor device 106.

At operation 202, the information gateway device 104 receives a data request 120 from a data source device 102. The data request 120 comprises one or more encrypted data elements 132 that are to be processed by a data processor device 106. In one embodiment, an encrypted data element 132 comprises account information that is associated with a user. Examples of account information include, but are not limited to, information that is associated with a user account, an employee account, a school account, an entity account, a financial account, or any other suitable type of account. As an example, the account information may comprise information associated with a financial account for a user. In this example, the encrypted data element 132 may further comprise additional information such as interaction information. In other embodiments, an encrypted data element 132 comprises a digital document for processing. Examples of digital documents include, but are not limited to, text files, tables, charts, presentations, images, files, documents, or any other suitable type of digital data.

In some embodiments, the information gateway device 104 generates a copy of the data request 120 in response to receiving the data request and stores the copy of the data request 120 in the memory (e.g. memory 114 and/or database 108). This process allows the information gateway device 104 to retain a copy of the data request 120 for data integrity in case a data request 120 becomes corrupt during processing.

At operation 204, the information gateway device 104 identifies a data source device 102 for the data request 120. Here, the information gateway device 104 identifies the data source device 102 that originated (e.g. created or sent) the data request 120. For example, the data request 120 may comprise a header that identifies a sending device. In this example, the header identifies the data source device 102 as the sending device. The information gateway device 104 may identify an IP address, a MAC address, a file directory, a folder address, an email address, a phone number, a device name, a device type, or any other type of information that identifies a data source device 102.

At operation 206, the information gateway device 104 identifies a first encryption key 124 that is associated with the data source device 102. The information gateway device 104 uses the information obtained from operation 204 to identify an encryption key 124 that is associated with the identified data source device 102. The information gateway device 104 uses the information that is associated with the identified data source device 102 as a search token to identify a corresponding data source identifier 122 within the stored encryption information 116. After identifying a corresponding data source identifier 122, the information gateway device 104 then identifies an encryption key 124 that is mapped to the identified data source identifier 122. As an example, the information gateway device 104 may identify a data source identifier 122 that matches a particular IP address or a MAC address for a data source device 102. The information gateway device 104 may then identify the encryption key 124 in the encryption information 116 that is used by the identified data source device 102.

As another example, the information gateway device 104 may first identify a device type that corresponds with the data source device 102. For example, the device type may indicate that the data source device 102 is a smartphone, a tablet, a laptop, a computer, a smart device, a database, a fuel dispenser terminal, a point-of-sale (POS) device, a handheld scanner device, a card reader, or any other suitable type of device. After determining a device type for the data source device 102, the information gateway device 104 may then identify a data source identifier 122 that matches the identified device type for the data source device 102. The information gateway device 104 then identifies an encryption key 124 in the encryption information 116 that is used by a data source device 102 having the identified device type.

At operation 208, the information gateway device 104 decrypts the encrypted data element 132 to generate a decrypted data element 132. Here, the information gateway device 104 applies the encryption key 124 that was identified in operation 206 to the encrypted data element 132 to decrypt the data element 132. The information gateway device 104 may use any suitable decryption technique or algorithm to decrypt the encrypted data element 132.

At operation 210, the information gateway device 104 identifies a data processor device 106 that is associated with the data request 120. Here, the information gateway device 104 identifies the data processor device 106 for receiving or processing the data elements 132 from the data request 120. In one embodiment, continuing with the previous example, the data request 120 may comprise a header that identifies an intended receiving device. In this example, the header identifies a data processor device 106 as the receiving device. The information gateway device 104 may identify an IP address, a MAC address, a file directory, a folder address, an email address, a phone number, a device type, or any other type of information that identifies a data processor device 106.

In another embodiment, the information gateway device 104 may identify a data processor device 106 based on the information type of the data elements 132 in the data request 120. In this case, the information gateway device 104 may first determine an information type associated with a data element 132 or the content within the data element 132. The information gateway device 104 may then identify a data processor device 106 that is configured to receive and/or process the identified information type of the data element 132. In other embodiments, the information gateway device 104 may identify a data processor device 106 based on any other suitable type or combination of information associated with the data request 120 or data elements 132 within the data request 120.

At operation 212, the information gateway device 104 identifies a second encryption key 124 that is associated with the data processor device 106. The second encryption key 124 that is associated with the data processor device 106 is different from the first encryption key 124 that is used by the data source device 102. The information gateway device 104 uses the information obtained from operation 210 to identify an encryption key 124 that is associated with the identified data processor device 106. The information gateway device 104 uses the information associated with the identified data processor device 106 as a search token to identify a corresponding data processor device identifier 128 within the stored encryption information 116. After identifying a corresponding data processor device identifier 128, the information gateway device 104 then identifies an encryption key 124 that is mapped to the identified data processor device identifier 128. As an example, the information gateway device 104 may identify a data processor device identifier 128 that matches a particular IP address or a MAC address for a data processor device 106. The information gateway device 104 may then identify the encryption key 124 in the encryption information 116 that is used by the identified data processor device 106.

As another example, the information gateway device 104 may first identify a device type that is associated with the data processor device 106. The information gateway device 104 may then identify a data processor device identifier 128 that matches the identified device type for the data processor device 106. The information gateway device 104 then identifies an encryption key 124 in the encryption information 116 that is used by a device having the identified device type.

At operation 214, the information gateway device 104 encrypts the decrypted data element 132 to generate a re-encrypted data element 132. Here, the information gateway device 104 applies the encryption key 124 that was identified in operation 212 to the decrypted data element 132 to re-encrypt the data element 132. The information gateway device 104 may use any suitable decryption technique or algorithm to encrypt the data element 132.

At operation 216, the information gateway device 104 identifies routing instructions 130 associated with the data processor device 106. Here, the information gateway device 104 uses the data processor device identifier 128 that is associated with the identified data processor device 106 as a search token to identify routing instructions 130 within the stored routing information 118. Examples of routing instructions 130 include, are not limited to, an IP address, a MAC address, a file directory, a folder address, an email address, a phone number, or any other type of address for a data processor device 106.

At operation 218, the information gateway device 104 determines whether the data processor device 106 is available. In one embodiment, the information gateway device 104 determines whether the data processor device 106 is available based on availability information that is provided by the data processor device 106. For example, the data processor device 106 may periodically send information about the availability of the data processor device 106 to the information gateway device 104. For instance, the data processor device 106 may send a message to the information gateway device 104 that indicates whether the data processor device 106 is available or offline. In some embodiments, the data processor device 106 may send information about scheduled time when the data processor device 106 will be online or offline, for example, for scheduled maintenance.

In some embodiments, the information gateway device 104 may determine whether the data processor device 106 is available based on previous attempts to data to the data processor device 106. For example, the information gateway device 104 may determine that the data processor device 106 is offline when one or more attempts to send data to the data processor device 106 have failed within a predetermined period of time. In this example, the information gateway device 104 may determine that the data processor device 106 is online or available when the information gateway device 104 has been able to successfully communicate data with the data processor device 106 within a predetermined period of time. In other embodiments, the information gateway device 104 may determine whether the data processor device 106 is available based on any other suitable type or combination of information.

The information gateway device 104 remains at operation 218 in response to determining that the data processor device 106 is not currently available. In this case, the information gateway device 104 may temporarily store data requests 120 or data elements 132 (e.g. re-encrypted data elements 132) locally in memory 114 or in the database 108 when a data processor device 106 is unavailable. The information gateway device 104 may later retrieve the stored data requests 120 or data elements 132 to send to the data processor device 160 after a predetermined amount of time has elapsed.

In some embodiments, the information gateway device 104 may identify a secondary or backup data processor device 106 to send the re-encrypted data element 132 to in the event that the primary data processor device 106 is unavailable. In this example, the information gateway device 104 may repeat the process described in operation 210 to identify another data processor device 106 that is associated with the data request 120. In other words, the information gateway device 104 may identify a backup data processor device 106 that can process the encrypted data elements 132. In this case, the information gateway device 104 will re-encrypt the data elements 132 using the appropriate encryption key 124 for the backup data processor device 106 and proceeds to operation 220 to send the re-encrypted data element 132 to the backup data processor device 106.

Returning to operation 218, the information gateway device 104 proceeds to operation 220 in response to determining that the data processor device 106 is available. In this case, the information gateway device 104 will transmit the re-encrypted data element 132 to the data processor device 106 for further processing. At operation 220, the information gateway device 104 sends the re-encrypted data element 132 to the data processor device 106. Here, the information gateway device 104 uses the routing instructions 130 that were identified in operation 216 to send the re-encrypted data element 132 to the data processor device 106. For example, the information gateway device 104 may first identify an IP address that is associated with the data processor device 106 from the routing instructions 130 that are associated with the data processor device 106. The information gateway device 104 may then send the re-encrypted data element 132 to the IP address that is associated with the data processor device 106. In some embodiments, the routing instructions 130 may further identify an encryption protocol, a messaging protocol, or any other suitable type of information about how to transmit the re-encrypted data element 132 to the data processor device 106. In this case, the information gateway device 104 may implement any additional communication protocols that are specified by the routing instructions 130 for the data processor device 106.

In response to receiving the re-encrypted data element 132, the data processor device 106 decrypts the re-encrypted data element 132 using the appropriate encryption key 124 and begins processing the data element 132. For example, when the data element 132 comprises interaction information, the data processor device 106 may facilitate an interaction using the interaction information. For instance, the data element 132 may comprise information identifying a product or service, a value amount for the product or service, and card information for a user. The data processor device 106 may process the data element 132 by performing an interaction for the value amount of the product or service using the card information for the user. As another example, when the data element 132 comprises a digital document for processing, the data processor device 106 may process the data element 132 by storing the digital document, modifying the digital document, extracting information from the digital document, and/or performing any other suitable type of operation on the digital document. In other examples, the data processor device 106 may perform any other suitable type of operations to process the data element 132.

Hardware Configuration for the Information Gateway Device

Figure 3:
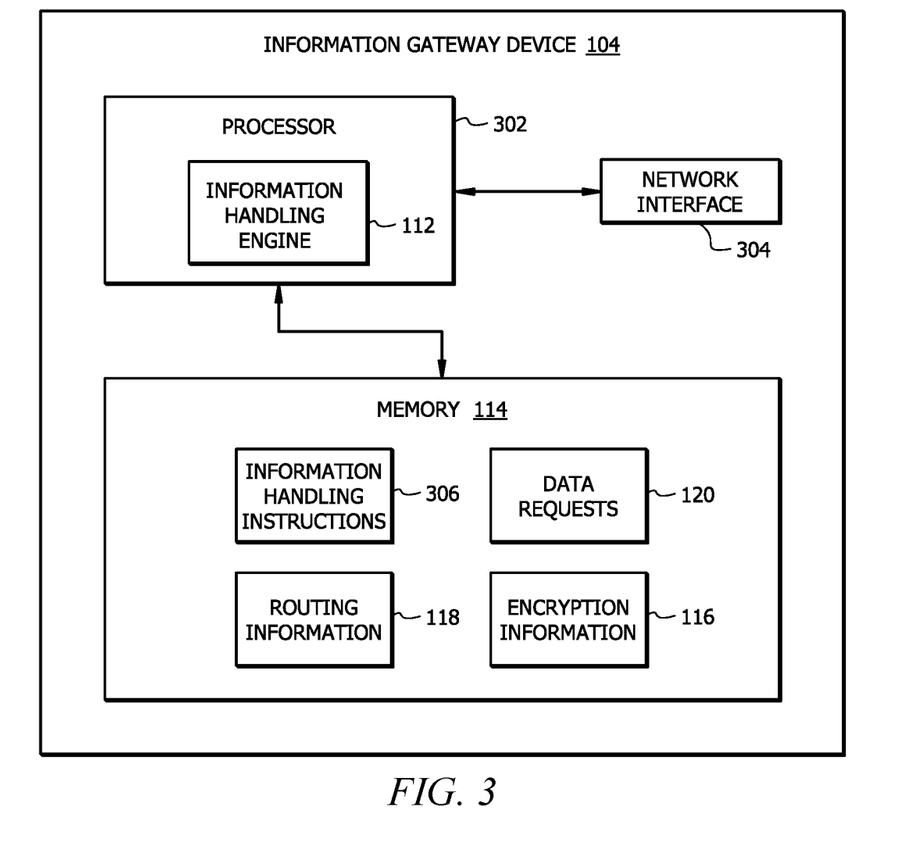
FIG. 3 is an embodiment of an information gateway device for the information system.

FIG. 3 is an embodiment of an information gateway device 104 for the information system 100. As an example, the information gateway device 104 may be a server, an access point, or a computer. The information gateway device 104 comprises a processor 302, a memory 114, and a network interface 304. The information gateway device 104 may be configured as shown or in any other suitable configuration.

Processor

The processor 302 is a hardware device that comprises one or more processors operably coupled to the memory 114. The processor 302 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). The processor 302 may be a programmable logic device, a microcontroller, a microprocessor, or any suitable combination of the preceding. The processor 302 is communicatively coupled to and in signal communication with the memory 114 and the network interface 304. The one or more processors are configured to process data and may be implemented in hardware or software. For example, the processor 302 may be 8-bit, 16-bit, 32-bit, 64-bit, or of any other suitable architecture. The processor 302 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute information handling instructions 306 to implement the information handling engine 112. In this way, processor 302 may be a special-purpose computer designed to implement the functions disclosed herein. In an embodiment, the information handling engine 112 is implemented using logic units, FPGAs, ASICs, DSPs, or any other suitable hardware. The information handling engine 112 is configured to operate as described in FIGS. 1 and 2. For example, the information handling engine 112 may be configured to perform the steps of process 200 as described in FIG. 2.

Memory

The memory 114 is a hardware device that is operable to store any of the information described above with respect to FIGS. 1 and 2 along with any other data, instructions, logic, rules, or code operable to implement the function(s) described herein when executed by the processor 302. The memory 114 comprises one or more disks, tape drives, or solid-state drives, and may be used as an over-flow data storage device, to store programs when such programs are selected for execution, and to store instructions and data that are read during program execution. The memory 114 may be volatile or non-volatile and may comprise a read-only memory (ROM), random-access memory (RAM), ternary content-addressable memory (TCAM), dynamic random-access memory (DRAM), and static random-access memory (SRAM).

The memory 114 is operable to store information handling instructions 306, data requests 120, encryption information 116, routing information 118, and/or any other data or instructions. The information handling instructions 306 may comprise any suitable set of instructions, logic, rules, or code operable to execute the information handling engine 112. The data requests 120, encryption information 116, and the routing information 118 are configured similar to the data requests 120, encryption information 116, and the routing information 118 described in FIGS. 1 and 2, respectively.

Network Interface

The network interface 304 is a hardware device that is configured to enable wired and/or wireless communications. The network interface 304 is configured to communicate data between user devices (e.g. data source devices 102 and data processor devices 106) and other devices, systems, or domains. For example, the network interface 304 may comprise an NFC interface, a Bluetooth interface, a Zigbee interface, a Z-wave interface, a radio-frequency identification (RFID) interface, a WIFI interface, a LAN interface, a WAN interface, a PAN interface, a modem, a switch, or a router. The processor 302 is configured to send and receive data using the network interface 304. The network interface 304 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An information gateway device, comprising:
a memory operable to store:
encryption information identifying:
a first plurality of devices; and
a plurality of encryption keys, wherein each encryption key is mapped to a device from among the first plurality of devices; and
routing information identifying:
a second plurality of devices; and
routing instructions specifying how to send data to each device among the second plurality of devices; and
a processor operably coupled to the memory, configured to:
receive a data request comprising an encrypted data element, wherein the encrypted data element comprises account information for a user;
identify a data source device associated with sending the data request;
identify a first encryption key associated with the data source device in the encryption information;
decrypt the encrypted data element using the first encryption key to generate a decrypted data element;
identify a first data processor device associated with receiving the data request;
identify a second encryption key associated with the first data processor device, wherein the second encryption key is different from the first encryption key;
encrypt the decrypted data element to generate a re-encrypted data element;
identify routing instructions associated with the first data processor device in the routing information, wherein the routing instructions are pre-stored in the memory of the information gateway device, and wherein the routine instructions associated with the first data processor device specify how to send the re-encrypted data element to the first data processor device; and
send the re-encrypted data element to the first data processor device in accordance with the routing instructions.

2. The device of claim 1, wherein the first encryption key is associated with a device type for the data source device.

3. The device of claim 1, wherein the second encryption key is associated with a device type for the first data processor device.

4. The device of claim 1, wherein:
identifying the first data processor device comprises identifying an information type based on content of the encrypted data element; and
the first data processor device is identified based at least in part on the identified information type.

5. The device of claim 1, wherein sending the re-encrypted data element comprises:
determining the first data processor device is unavailable;
storing the re-encrypted data element;
retrieving the re-encrypted data element after a predetermined amount of time; and
sending the re-encrypted data element in response to retrieving the re-encrypted data element.

6. The device of claim 1, wherein the processor is further configured to determine that a second data processor device associated with receiving the data request is unavailable; and wherein the first data processor is identified in response to determining that the second data processor device associated with receiving the data request is unavailable.

7. The device of claim 1, wherein the processor is further configured to:
generate a copy of the data request in response to receiving the data request; and
store the copy of the data request in the memory.

8. An information routing method, comprising:
receiving a data request comprising an encrypted data element, wherein the encrypted data element comprises account information for a user;
identifying a data source device associated with sending the data request;
identifying a first encryption key associated with the data source device;
decrypting the encrypted data element using the first encryption key to generate a decrypted data element;
identifying a first data processor device associated with receiving the data request;
identifying a second encryption key associated with the first data processor device, wherein the second encryption key is different from the first encryption key;
encrypting the decrypted data element to generate a re-encrypted data element;
identifying routing instructions associated with the first data processor device, wherein the routing instructions are pre-stored in a memory of an information gateway device, and wherein the routing instructions associated with the first data processor device specify how to send the re-encrypted data element to the first data processor device; and
sending the re-encrypted data element to the first data processor device in accordance with the routing instructions.

9. The method of claim 8, wherein the first encryption key is associated with a device type for the data source device.

10. The method of claim 8, wherein the second encryption key is associated with a device type for the first data processor device.

11. The method of claim 8, wherein:
identifying the first data processor device comprises identifying an information type based on content of the encrypted data element; and
the first data processor device is identified based at least in part on the identified information type.

12. The method of claim 8, wherein sending the re-encrypted data element comprises:
determining the first data processor device is unavailable;
storing the re-encrypted data element;
retrieving the re-encrypted data element after a predetermined amount of time; and
sending the re-encrypted data element in response to retrieving the re-encrypted data element.

13. The method of claim 8, further comprising determining that a second data processor device associated with receiving the data request is unavailable; and
wherein the first data processor is identified in response to determining that the second data processor device associated with receiving the data request is unavailable.

14. The method of claim 8, further comprising:
generate a copy of the data request in response to receiving the data request; and
store the copy of the data request in the memory.

15. A non-transitory computer-readable medium storing instructions that when executed by a processor cause the processor to:
receive a data request comprising an encrypted data element, wherein the encrypted data element comprises account information for a user;
identify a data source device associated with sending the data request;
identify a first encryption key associated with the data source device;
decrypt the encrypted data element using the first encryption key to generate a decrypted data element;
identify a first data processor device associated with receiving the data request;
identify a second encryption key associated with the first data processor device, wherein the second encryption key is different from the first encryption key;
encrypt the decrypted data element to generate a re-encrypted data element;
identify routing instructions associated with the first data processor device, wherein the routing instructions are pre-stored in a memory of an information gateway device, and wherein the routing instructions associated with the first data processor device specify how to send the re-encrypted data element to the first data processor device; and
send the re-encrypted data element to the first data processor device in accordance with the routing instructions.

16. The non-transitory computer-readable medium of claim 15, wherein the first encryption key is associated with a device type for the data source device.

17. The non-transitory computer-readable medium of claim 15, wherein the second encryption key is associated with a device type for the first data processor device.

18. The non-transitory computer-readable medium of claim 15, wherein:
identifying the first data processor device comprises identifying an information type based on content of the encrypted data element; and
the first data processor device is identified based at least in part on the identified information type.

19. The non-transitory computer-readable medium of claim 15, wherein sending the re-encrypted data element comprises:
determining the first data processor device is unavailable;
storing the re-encrypted data element;
retrieving the re-encrypted data element after a predetermined amount of time; and
sending the re-encrypted data element in response to retrieving the re-encrypted data element.

20. The non-transitory computer-readable medium of claim 15, wherein the instructions further cause the processor to determine that a second data processor device associated with receiving the data request is unavailable; and
wherein the first data processor is identified in response to determining that the second data processor device associated with receiving the data request is unavailable.

* * * * *